(12) United States Patent
Niedermaier et al.

(10) Patent No.: US 12,509,057 B2
(45) Date of Patent: Dec. 30, 2025

(54) DEVICE AND METHOD FOR REDUCING NOISE IN AN INTERIOR OF A VEHICLE

(71) Applicant: ZF Friedrichshafen AG, Friedrichshafen (DE)

(72) Inventors: Lukas Niedermaier, Ravensburg-Oberhofen (DE); Phil Karaman, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 148 days.

(21) Appl. No.: 18/548,653

(22) PCT Filed: Mar. 1, 2022

(86) PCT No.: PCT/EP2022/055154
§ 371 (c)(1),
(2) Date: Sep. 1, 2023

(87) PCT Pub. No.: WO2022/184715
PCT Pub. Date: Sep. 9, 2022

(65) Prior Publication Data
US 2024/0140396 A1 May 2, 2024

(30) Foreign Application Priority Data
Mar. 5, 2021 (DE) .................. 10 2021 202 165.4

(51) Int. Cl.
*B60W 20/17* (2016.01)

(52) U.S. Cl.
CPC ....... *B60W 20/17* (2016.01); *B60W 2510/225* (2013.01)

(58) Field of Classification Search
CPC ............ B60W 20/17; B60W 2510/225; G10K 2210/1282; G10K 2210/12821;
(Continued)

(56) References Cited

U.S. PATENT DOCUMENTS

| 5,558,188 A | * | 9/1996 | Samonil | ................. F16F 9/464 188/266.6 |
| 5,752,879 A | * | 5/1998 | Berdut | ............... A63B 22/0023 482/142 |

(Continued)

FOREIGN PATENT DOCUMENTS

| DE | 10005849 A1 | 8/2000 |
| DE | 102016122843 A1 | 5/2018 |

(Continued)

OTHER PUBLICATIONS

International Search Report (English Translation) PCT/EP2022/055154, dated May 19, 2022. (2 pages).

(Continued)

*Primary Examiner* — Masud Ahmed
(74) *Attorney, Agent, or Firm* — Dority & Manning, P.A.

(57) ABSTRACT

A device for reducing noise in an interior space of a vehicle is provided. The vehicle includes a body having the interior space, at least one tire, and one wheel rim associated with the tire. The tire and the wheel rim are mounted onto a suspension strut, and the suspension strut is mounted onto the body. The device is arranged outside the interior space of the vehicle. The device includes a sound determination unit and a sound reduction unit. The sound determination unit includes a sensor configured for determining structure-borne noise. The sound reduction unit is configured for generating a vibration.

11 Claims, 3 Drawing Sheets

(58) Field of Classification Search
CPC ..... G10K 2210/1291; G10K 11/17873; G10K 11/17861; G10K 2210/129; G10K 2210/3211
See application file for complete search history.

(56) References Cited

U.S. PATENT DOCUMENTS

| | | | |
|---|---|---|---|
| 6,382,648 B1* | 5/2002 | Handke | B60G 15/063 |
| | | | 280/124.147 |
| 11,387,727 B2* | 7/2022 | Parish | H02K 35/02 |
| 2013/0311040 A1* | 11/2013 | Hasegawa | G10K 11/17879 |
| | | | 701/36 |
| 2020/0139782 A1* | 5/2020 | Goto | F16F 9/50 |
| 2020/0256630 A1* | 8/2020 | Rosenblum | F41A 9/51 |
| 2022/0381859 A1* | 12/2022 | Srinivasan | G01R 33/3802 |

FOREIGN PATENT DOCUMENTS

| | | |
|---|---|---|
| JP | 2007015471 A | 1/2007 |
| JP | 2012210836 A | 11/2012 |
| JP | 5670291 B2 | 2/2015 |

OTHER PUBLICATIONS

German Search Report DE 10 2021 202 165.4, dated Aug. 17, 2021. (12 pages).

* cited by examiner

DEVICE AND METHOD FOR REDUCING NOISE IN AN INTERIOR OF A VEHICLE

CROSS-REFERENCE TO RELATED APPLICATIONS

The present application is related and has right of priority to German Patent Application No. 102021202165.4 filed on Mar. 5, 2021 and is a U.S. national phase entry of PCT/EP2022/055154 filed on Mar. 1, 2022, both of which are incorporated by reference in their entirety for all purposes.

FIELD OF THE INVENTION

The present invention relates generally to a device and to a method for reducing noise in an interior space of a vehicle. The invention further relates generally to a suspension strut, which includes the device for reducing noise.

BACKGROUND

In a modern vehicle, in particular in a vehicle which includes a hybrid drive, a fuel-cell drive or an electric drive, in particular, tonal noises, such as wheel-induced noises, in the interior space can be perceived by a driver and/or passengers as distracting. Structure-borne noise refers to vibrations that propagate in a structure of the vehicle. Noises arise due to the vibrations radiating on a surface in the interior space, the noises being referred to, for example, as humming, droning or whining.

Various approaches are known for reducing noise in the interior space of the vehicle. In addition to passive measures for deadening, muffling and insulating, there are active methods. For example, any sound in the interior space is determined and an anti-noise is generated, which attenuates or cancels out the sound via destructive interference. In this approach to active noise reduction, the sound is determined and the anti-noise is generated in the interior space. It is disadvantageous that this method has a complex dependence on the number of persons, their seating positions and, in particular, the frequency to be reduced.

DE 100 05 849 A1 describes a device for reducing noise, the device being arranged on the suspension strut. The device includes a supporting face formed from an elastomeric material. The device is arranged between a cylindrical spring and a spring cup of the suspension strut.

SUMMARY OF THE INVENTION

Example aspects of the invention provide a device for reducing noise in the interior space of the vehicle.

Example aspects of the invention relate to a device for reducing noise in an interior space of a vehicle. The vehicle includes a body having the interior space, at least one tire and a wheel rim associated with the tire. The tire and the wheel rim are mounted onto a suspension strut. The suspension strut is mounted onto the body. The device is arranged outside the interior space of the vehicle. The device includes a sound determination unit and a sound reduction unit.

The sound determination unit has a sensor, the sensor being designed to determine any structure-borne noise. The sound reduction unit is designed to reduce the transmission of structure-borne noise.

The vehicle includes the body which encloses the interior space, the interior space being designed such that the driver and further passengers can be located therein.

The term "vehicle" is to be understood as any vehicle having three, four or more wheels. The term "vehicle" also encompasses any types of drives of the vehicle, in particular electric drives, semi-electric drives, hybrid drives, hydrogen drives, and conventional internal-combustion-engine drives.

One wheel or multiple wheels each include both a wheel rim and a tire, which, together with any further necessary components, result in the wheel. The wheel is arranged on the suspension strut.

The suspension strut is part of a wheel suspension and/or of the chassis. In particular, the suspension strut is part of an active chassis which connects the wheel to the vehicle. The suspension strut is arranged on the chassis. A chassis of the vehicle is referred to as an active chassis when an actuator that generates forces is present on the chassis.

The suspension strut includes a damper, a damper rod, a spring, a lower spring cup and an upper spring cup, and a holding fixture for the wheel, the holding fixture being arranged at the lower end of the suspension strut, in particular at a lower end of the damper. Advantageously, the damper rod adjoins the damper at the top of the damper. The lower spring cup is arranged, for example, on the damper and the upper spring cup is arranged on the damper rod. Advantageously, the upper region of the suspension strut has a strut bearing. The strut bearing includes an upper spring cup, the elastomer and a body-side support surface of the elastomer.

The device according to example aspects of the invention is designed to reduce sound and/or vibrations and/or noises. The device is arranged outside the interior space. The device includes the sound determination unit and the sound reduction unit. Preferably, the sound determination unit is arranged on the body or on the suspension strut. The sound determination unit includes a sensor, for example, an acceleration sensor, a force sensor, and/or a strain gauge sensor. The sensor is preferably arranged on the body. The sensor detects any sound and/or structure-borne noise and/or vibrations. The sound reduction unit is designed to generate the vibration, and/or the anti-noise and/or sound and/or vibrations. For example, the sound reduction unit is designed to generate a vibration that destructively interacts with the existing structure-borne noise. Alternatively, the sound reduction unit is designed to attenuate or prevent an entry of structure-borne noise into the body by frequency-selective stiffness reduction of the elastomer.

Example aspects of the invention offer the advantage that less structure-borne noise or no structure-borne noise that arises due to a wheel-induced vibration is directed into the interior space.

In one further example embodiment, the sound reduction unit includes an electric motor. Preferably, the electric motor is a servomotor of the active chassis. Advantageously, the electric motor is a motor of the damper, in particular of a pump of the active chassis. Preferably, the servomotor is controllable by way of a closed-loop system such that structure-borne noise can be generated via a coil-rotor assembly of the servomotor. Advantageously, this structure-borne noise is transmittable to the spring-damper unit and is tuned such that the two vibrations advantageously superpose themselves and the sound transmitted into the interior space and/or the noise are/is attenuated and/or disappear(s). Preferably, the sound and/or the noises and/or the vibrations is/are attenuated according to the method of destructive interference.

In particular, the electric motor is arranged on the suspension strut and/or on the body.

In one further example embodiment, the electric motor is a servomotor of the active chassis. Advantageously, the electric motor is a motor of the damper, in particular of a pump of the active chassis. Preferably, the servomotor is controllable by way of a closed-loop system such that the servomotor can generate a change in volume and/or pressure within the spring-damper unit. Due to this effect on the transmission medium, an excitation of force arises in the direction of the piston/damper rod. The excitation of force can be used to generate a vibration, with which the existing structure-borne noise is reducible.

In one further advantageous example embodiment, the sound reduction unit includes an actuator unit. The actuator unit is, for example, an electromagnetic actuator or an electrodynamic actuator. Preferably, the dynamic stiffness of the elastomer in the strut bearing is influenced in a frequency-dependent manner by the dynamic action of force of the actuator between the piston/damper rod and the body side, and thus the transmission of sound onto the body side is reduced. Advantageously, the attenuation of the sound is based on a frequency-selective stiffness reduction of the elastomer. In particular, this is achieved by a suitable superimposition of magnetic gap forces with the motion generated by the action of force. In this approach to the attenuation of the sound, it is further preferred when no force is transmitted between the sound reduction unit and the body. Advantageously, the elastomer is influenced by the introduced oscillatory movement of the magnet-armature-actuator such that the elastomer does not transmit any vibration and/or any sound to the body, the sound being introduced via the damper rod. Preferably, the elastomer becomes so soft for a specific frequency range due to the vibration introduced into the elastomer that the elastomer very greatly damps and attenuates a vibration and/or sound that is introduced into the elastomer via the damper rod.

Preferably, the actuator unit is arranged on the upper end of the suspension strut. It is particularly preferred when the actuator unit is arranged above the strut bearing.

In one advantageous example development, the actuator unit includes a coil, the coil being arranged on the body of the vehicle. It is further preferred when the actuator unit includes a magnet, the magnet being arranged on the damper rod.

Advantageously, a static stiffness of the elastomer is not influenced by the actuator unit and a motion generated by the actuator unit. The static stiffness is important for the absorption of operating forces in the suspension strut.

According to one further advantageous example embodiment of the device, the magnet and the coil of the actuator unit are spaced from each other, the spacing being so great that the magnet is settable into motion by the coil. Preferably, the magnet and the coil are separated from each other by an air gap. It is further preferred when the magnet is plate-shaped and the coil is annular. Preferably, the magnet is settable into oscillation in the coil. Particularly advantageously, the magnet oscillates within the coil. In particular, the elastomer is compressed and re-expanded via the oscillation of the magnet-armature-actuator. In one preferred example embodiment, the sound determination unit includes a sensor. Preferably, the sensor is an acceleration sensor and is arranged on the body side of the strut bearing. In particular, the sensor is connected to a control unit, for example, a control unit which includes power electronics. It is also conceivable that the sensor is connected to a control unit of the active chassis.

In one further example embodiment, the coil is arranged on the upper end of the damper rod and the magnet is arranged on the body.

In one further example embodiment, the coil and the magnet can be arranged such that the magnet and the coil exert forces onto each other in all three spatial directions. For example, multiple magnets and/or multiple coils can be present.

Further advantageously, the device is present in addition to a passive structure-borne noise reduction means. In particular, the structure-borne noise reduction means is an elastomeric bearing, for example, a rubber strut bearing. Advantageously, the sound reduction unit is one further, additional possibility for reducing or preventing structure-borne noise. No structural changes to the existing active chassis are necessary due, in particular, to the additional presence in addition to the passive structure-borne noise reduction means, for example, in the form of the rubber strut bearing.

Example aspects of the invention also relate to a method for reducing noise, characterized in that a sound determination unit detects a structure-borne noise, the sound determination unit including a sensor, the sound determination unit cooperating with a sound reduction unit, and the sound reduction unit generating an anti-noise and/or acting on the elastomer.

Advantageously, the sensor detects any structure-borne noise on a body side. An ascertained value for the structure-borne noise is forwarded to the sound determination unit. On the basis of the ascertained value, the sound determination unit determines a suitable anti-noise, which is generated by the sound reduction unit.

Example aspects of the invention further relate to a suspension strut which includes the device as described above.

BRIEF DESCRIPTION OF THE DRAWINGS

Advantageous embodiment variants of the invention are explained in greater detail in the drawings.

DETAILED DESCRIPTION

Figure 1:
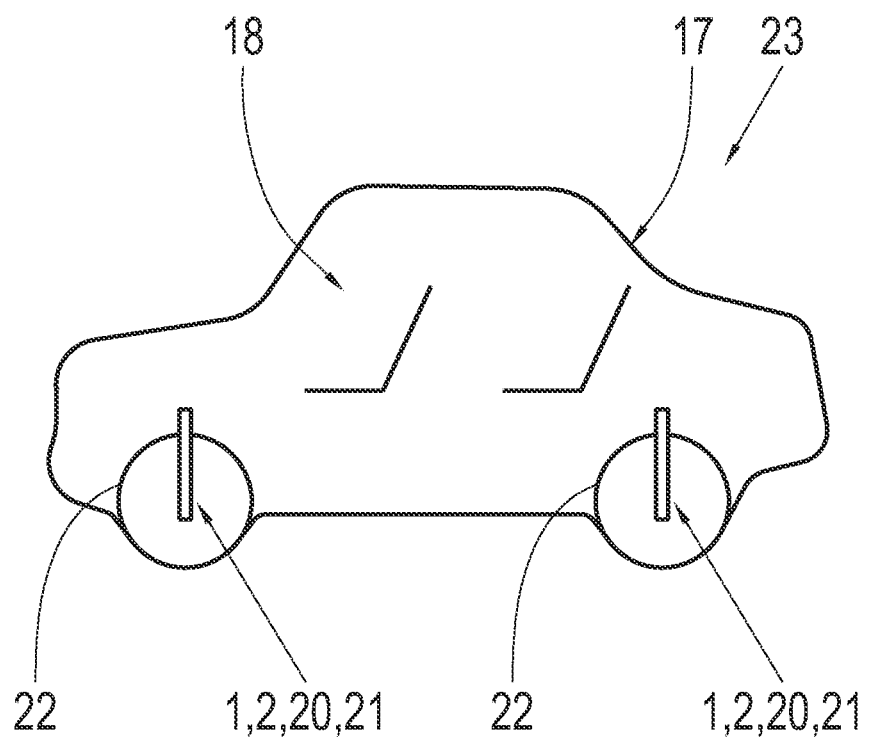
FIG. 1 shows a vehicle which includes the device 1 according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle 23 which includes a body 17 and an interior space 18. The device 1 is arranged in the region of the wheel 22. The device 1 includes a sound determination unit 20 and a sound reduction unit 21.

Figure 2:
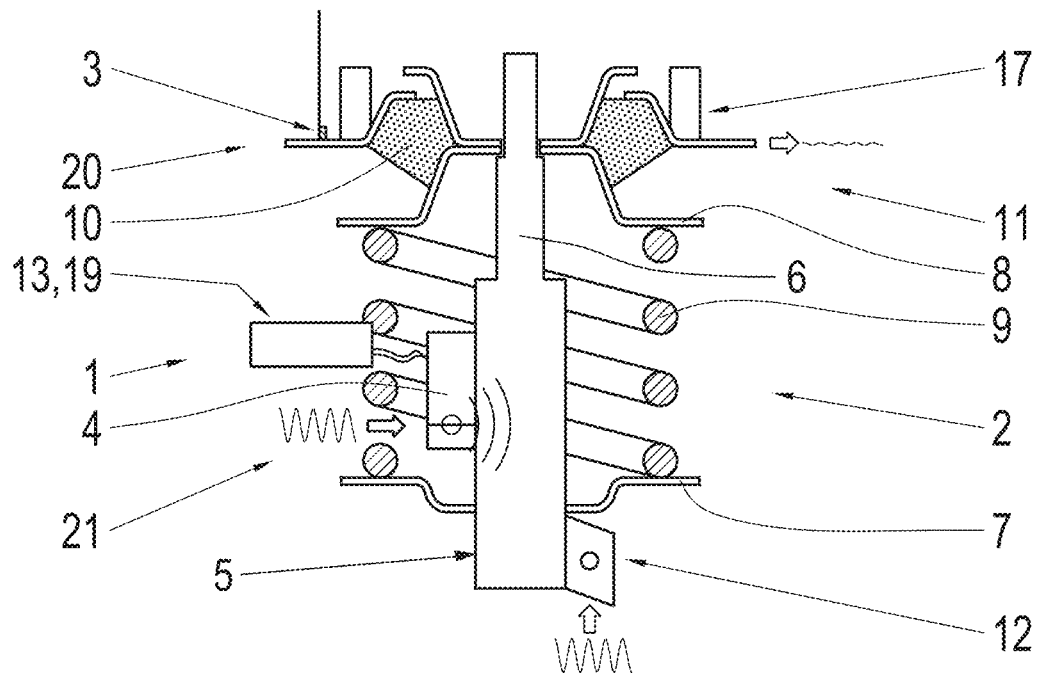
FIG. 2 shows a suspension strut, which includes a servomotor of the active chassis arranged on the suspension strut.

FIG. 2 shows the device 1 according to example aspects of the invention. The device 1 is designed to reduce noise in the interior space 18 of the vehicle 23. The device 1 includes the sound determination unit 20. The sound determination unit 20 includes a sensor 3, which is, for example, an acceleration reference sensor 3. The device 1 also includes a sound reduction unit 21, which is, for example, a servomotor 4 of an active chassis 2.

The chassis 2 includes a damper 5, a damper rod 6, a lower spring cup 7, an upper spring cup 8, a spring 9, and an elastomer 10. The upper spring cup 8 and the elastomer 10 form a strut bearing 11. A wheel carrier 12 is arranged in the lower portion of the damper 5. A wheel (not shown) including a wheel rim (also not shown) are mountable on the wheel carrier 12. The damper rod 6 adjoins the damper 5 at the upper end of the damper 5. The spring 9 is arranged between the upper spring cup 8 and the lower spring cup 7. The elastomer 10 is arranged on the upper spring cup 8. One side of the elastomer 10 is arranged on the spring cup 8 and the other side of the elastomer 10 is arranged on a body-side support surface. The two spring cups 7 and 8 as well as the spring 9 and the elastomer 10 are rotationally symmetrical, in particular circular. The servomotor 4 is arranged on the damper 5. In particular, the servomotor 4 is the servomotor of the active chassis. The servomotor 4 is controllable by way of a closed-loop system, for example, actuatable, by a control unit 13, which includes power electronics 19. The control unit 13 and the acceleration reference sensor 3 are connected to each other. The connection is designed such that an exchange of data and measured values is possible. For example, the connection is established by a cable. A wireless connection is also possible.

Figure 3:
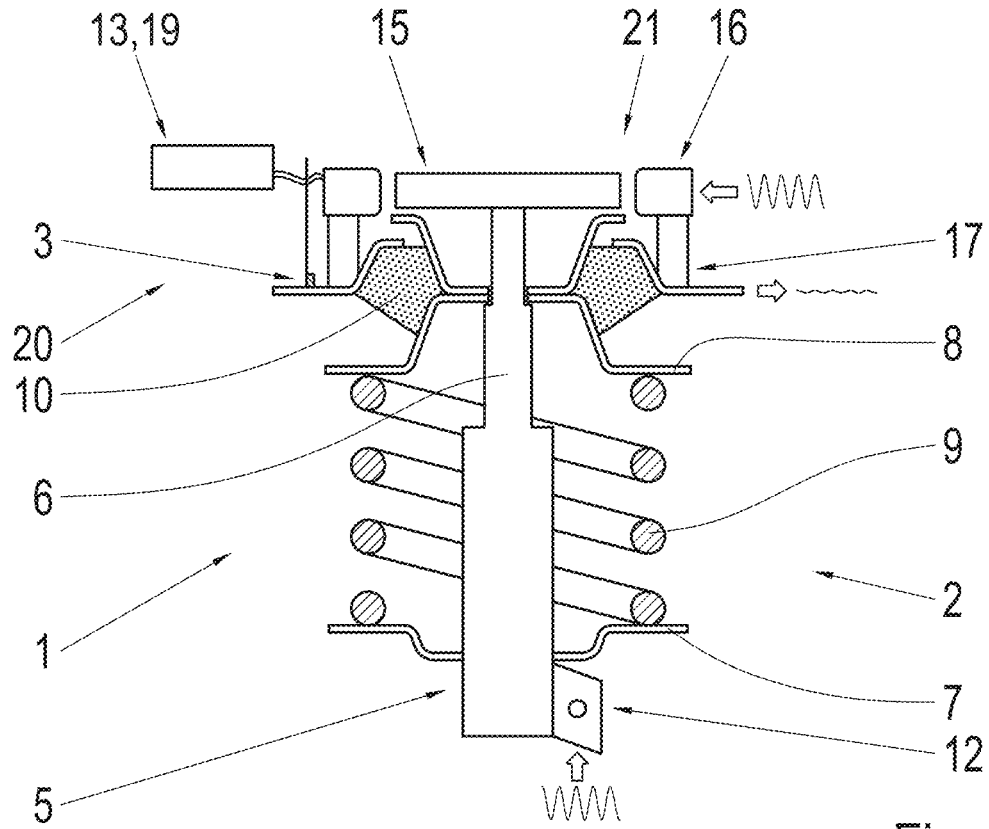
FIG. 3 shows an alternative suspension strut, which includes a contactless magnet-armature-actuator on the upper end of the damper rod.

FIG. 3 shows, by way of example, one further device according to example aspects of the invention, which includes a magnet armature 15 arranged on the damper rod 6. The magnet armature 15 is mounted on the upper end of the damper rod 6. Preferably, the magnet armature 15 is arranged at an angle, in particular at a right angle, to the damper rod 6. Preferably, the magnet armature 15 is planar, for example, having a face which is comparable to a diameter of the elastomer 10. The height of the magnet armature 15 is less than, in particular only a fraction of, the diameter of the elastomer 10. A coil 16 is arranged at the same level as the magnet armature 15. The coil 16 is arranged on the body 17. Preferably, the coil 16 is circular. For example, the magnet armature 15 is centrally arranged within the coil 16, in particular such that the magnet armature 15 and the coil 16 are contactlessly arranged, for example, having an air gap therebetween. A control unit, for example, the control unit 13, is arranged at the coil 16.

Figure 4:
FIG. 4 shows a method sequence.

FIG. 4 shows a method sequence. In step 1 (S1), the sensor 3 detects a structure-borne noise at the body 17. In step 2 (S2), a necessary anti-noise is determined by the sound determination unit, which includes the sensor 3. The sound determination unit cooperates with the sound reduction unit. The necessary anti-noise is generated by the sound reduction unit in step 3 (S3).

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 device
2 chassis
3 sensor
4 servomotor
5 damper
6 damper rod
7 lower spring cup
8 upper spring cup
9 spring
10 elastomer
11 strut bearing
12 wheel carrier
13 control unit
14 support surface
15 magnet armature
16 coil
17 body
18 interior space
19 power electronics
20 sound determination unit
21 sound reduction unit
22 wheel
23 vehicle
S1 step
S2 step
S3 step

The invention claimed is:

1. A device (1) for reducing noise in an interior space (18) of a vehicle (23) that includes a body (17) with the interior space (18), a tire, and a wheel rim, the tire and the wheel rim mounted onto a suspension strut that is mounted onto the body, the device (1) being arranged outside the interior space (18) of the vehicle (23), the device comprising:
a sound determination unit (20), the sound determination unit (20) comprising a sensor (3) configured for determining structure-borne noise; and
a sound reduction unit (21), the sound reduction unit (21) being configured for generating a vibration, the sound reduction unit (21) being at least partially on the suspension strut of the vehicle (23) such that the vibration is transmitted to the suspension strut and attenuates the structure-borne noise.

2. The device (1) of claim 1, wherein the suspension strut comprises a damper (5) and a damper rod (6).

3. The device (1) of claim 2, wherein the sound reduction unit (21) comprises an actuator.

4. The device (1) of claim 3, wherein the actuator is arranged on an upper end of the suspension strut.

5. The device (1) of claim 3, wherein the actuator comprises:
a coil (16) arranged on the body (17) of the vehicle; and
a magnet (15) on the damper rod.

6. The device (1) of claim 5, wherein the magnet (15) and the coil (16) are spaced apart by a spacing, the magnet (15) being settable into motion by the coil (16).

7. The device (1) of claim 1, wherein the sound reduction unit (21) comprises an electric motor, the electric motor being on the suspension strut of the vehicle (23).

8. The device (1) of claim 7, wherein the electric motor is a servomotor (4) of an active chassis (2) of the vehicle (23).

9. The device (1) of claim 1, further comprising a passive structure-borne noise reduction means comprising an elastomeric bearing (10, 11).

10. A method for reducing noise, comprising:
    detecting a structure-borne noise in an interior space (18) of a body (17) of a vehicle (23) via a sensor (3) of a sound determination unit (20) arranged outside the interior space (18) of the vehicle (23), the vehicle (23) further including a tire and a wheel rim, the tire and the wheel rim being mounted onto a suspension strut that is mounted onto the body; and
    generating an anti-noise with a sound reduction unit (21) based at least in part on the structure-borne noise detected by the sound determination unit (20), the sound reduction unit (21) being arranged outside the interior space (18) of the vehicle (23) and at least partially on the suspension strut of the vehicle (23) such that the anti-noise is transmitted to the suspension strut and attenuates the structure-borne noise.

11. A suspension strut, comprising the device of claim 1.

\* \* \* \* \*